United States Patent
Miller et al.

(10) Patent No.: US 10,508,676 B2
(45) Date of Patent: Dec. 17, 2019

(54) CONNECTION ELEMENT, AND METHOD FOR CONNECTING AT LEAST TWO WORKPLACES

(71) Applicant: Arnold Umformtechnik GmbH & Co. KG, Forchtenberg-Ernsbach (DE)

(72) Inventors: Heiko Miller, Öhringen (DE); Dominik Fröhlich, Zweiflingen (DE)

(73) Assignee: Arnold Umformtechnik GmbH & Co. KG, Forchtenberg-Ernsbach (DE)

( * ) Notice: Subject to any disclaimer, the term of this patent is extended or adjusted under 35 U.S.C. 154(b) by 259 days.

(21) Appl. No.: 15/432,436

(22) Filed: Feb. 14, 2017

(65) Prior Publication Data
US 2017/0370393 A1    Dec. 28, 2017

(30) Foreign Application Priority Data
Jun. 27, 2016  (DE) .................. 10 2016 211 444

(51) Int. Cl.
*F16B 15/06*    (2006.01)
*F16B 19/14*    (2006.01)

(52) U.S. Cl.
CPC ............ *F16B 15/06* (2013.01); *F16B 19/14* (2013.01)

(58) Field of Classification Search
CPC ......... F16B 15/06; F16B 19/14; F16B 35/041
(Continued)

(56) References Cited

U.S. PATENT DOCUMENTS

| | | | | |
|---|---|---|---|---|
| 1,070,247 A | * | 8/1913 | Haines Fp | F16B 39/30 411/259 |
| 2,754,871 A | * | 7/1956 | Stoll | F16B 39/30 411/283 |

(Continued)

FOREIGN PATENT DOCUMENTS

| | | |
|---|---|---|
| CN | 101057081 | 10/2007 |
| CN | 201011352 | 1/2008 |

(Continued)

OTHER PUBLICATIONS

Chinese Office Action dated Nov. 28, 2018 (9 pages).
Translation of Korean Office Action dated Feb. 20, 2019 (7 pages).

*Primary Examiner* — Roberta S Delisle
(74) *Attorney, Agent, or Firm* — Boyle Fredrickson, S.C.

(57) ABSTRACT

The invention relates to a connection element for interconnecting at least two workpieces, having a shaft; a connection-element head, radially protruding beyond the external side of the shaft, at the one end of the shaft; a drive configuration on the connection-element head and a front shaft end, wherein in a holding portion of the shaft that emanates from the lower side of the connection-element head at least one pair of closed annular protrusions are disposed thereon, of which at least one annular protrusion is not completely disposed in a plane that runs perpendicularly to the longitudinal axis of the shaft; and the spacings between the two annular protrusions of the pair along the circumference are of dissimilar size, or the two annular protrusions of the pair of annular protrusions are disposed so as to be mutually parallel; wherein the front end of the shaft is configured as a tapered hole-forming portion, and wherein a maximum external diameter of the hole-forming portion is between 3% and 10% smaller, in particular 5% smaller, than a maximum external diameter of the annular protrusions.

16 Claims, 2 Drawing Sheets

(58) Field of Classification Search
USPC .......................................... 411/424, 455, 498
See application file for complete search history.

(56) References Cited

U.S. PATENT DOCUMENTS

| | | | | |
|---|---|---|---|---|
| 3,156,152 | A * | 11/1964 | Edgar Reed | F16B 15/06 411/386 |
| 3,977,142 | A | 8/1976 | Dove et al. | |
| 6,494,656 | B1 * | 12/2002 | Boyer | B21H 3/027 411/399 |
| 6,872,042 | B2 * | 3/2005 | Panasik | F16B 15/06 411/451.1 |
| 7,232,283 | B2 * | 6/2007 | Dill | F16B 15/06 411/453 |
| 7,326,014 | B2 * | 2/2008 | Levey | F16B 31/04 411/307 |
| 8,348,572 | B2 * | 1/2013 | Friederich | F16B 25/0021 411/387.1 |
| 8,375,549 | B2 * | 2/2013 | Draht | F16B 19/14 29/432 |
| 9,435,366 | B2 | 9/2016 | Draht et al. | |
| 2016/0195123 | A1 | 7/2016 | Miller et al. | |

FOREIGN PATENT DOCUMENTS

| | | |
|---|---|---|
| CN | 201461652 | 5/2010 |
| CN | 105637235 | 6/2016 |
| DE | 10 2011 009 599 A1 | 10/2011 |
| JP | 19940213220 | 8/1994 |
| JP | H06213220 | 8/1994 |
| JP | 11062930 | 3/1999 |
| JP | 2003-027669 | 1/2003 |
| JP | 2008-180340 | 8/2008 |
| JP | 3148742 | 2/2009 |
| JP | 2009523965 | 6/2009 |
| JP | 2015-137764 | 7/2015 |

* cited by examiner

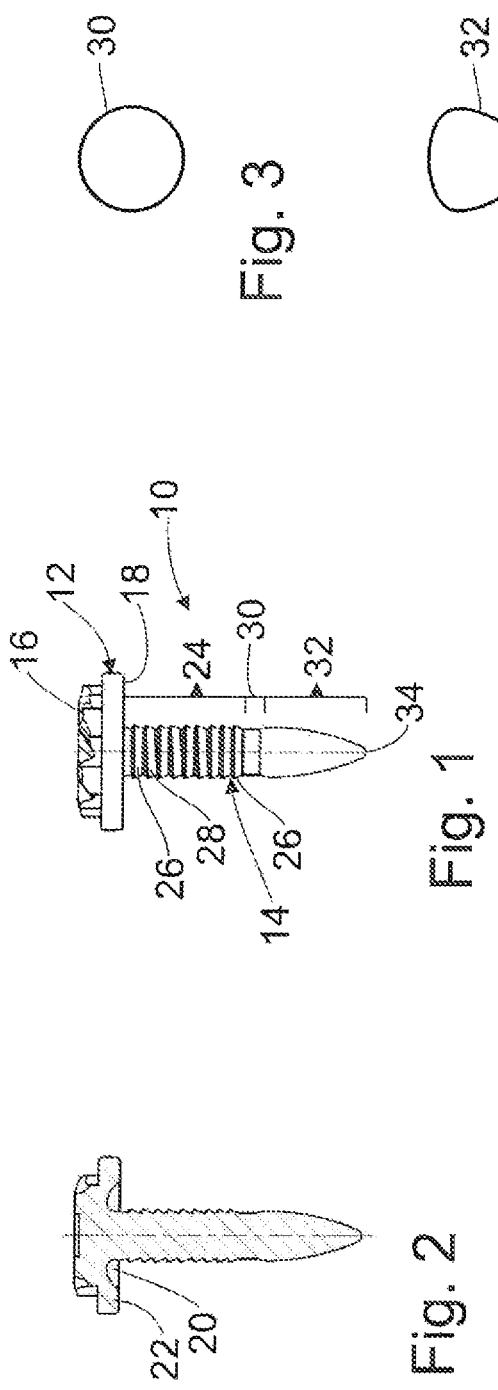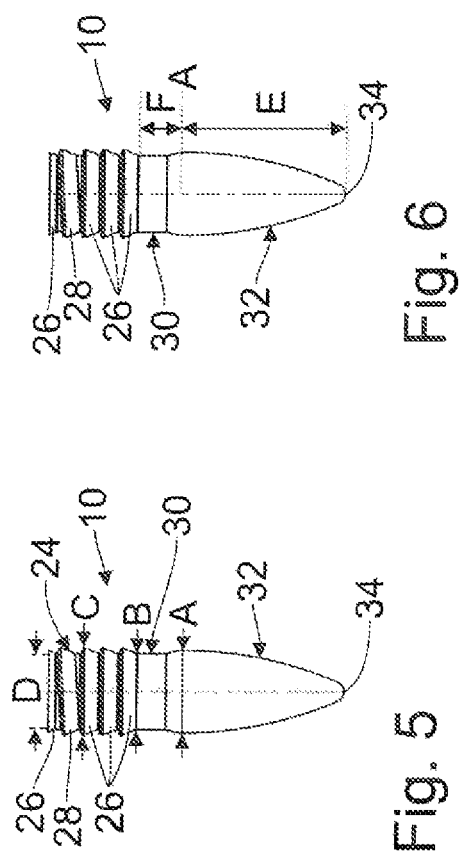

CONNECTION ELEMENT, AND METHOD FOR CONNECTING AT LEAST TWO WORKPLACES

BACKGROUND

The invention relates to a connection element for interconnecting at least two workplaces, having a shaft; a connection-element head, radially protruding beyond the external side of the shaft, at the one end of the shaft and a rotating drive configuration on the connection-element head, wherein in a holding portion of the shaft that emanates from the lower side of the connection-element head at least one pair of closed annular protrusions are disposed thereon, of which at least one annular protrusion is not completely disposed in a plane that runs perpendicularly to the longitudinal axis of the shaft; and the spacings between the two annular protrusions of the pair along the circumference are of dissimilar size, or the two annular protrusions of the pair of annular protrusions are disposed so as to be mutually parallel; wherein a front end of the shaft is configured as a tapered hole-forming portion.

Such a connection element is known from the international unexamined and first publication WO 2015/022124 A1.

SUMMARY

By way of the invention, a connection element and a method for connecting at least two workplaces are to be improved.

To this end, according to the invention, a connection element for interconnecting at least two workplaces, having a shaft; connection-element head, radially protruding beyond the external side of the shaft, at the one end of the shaft and a rotating drive configuration on the connection-element head, wherein in a holding portion of the shaft that emanates from the lower side of the connection-element head at least one pair of closed annular protrusions are disposed thereon, of which at least one annular protrusion is not completely disposed in a plane that runs perpendicularly to the longitudinal axis of the shaft; and wherein the spacings between the two annular protrusions of the pair along the circumference are of dissimilar size, or the two annular protrusions of the pair of annular protrusions are disposed so as to be mutually parallel is provided, wherein the front end of the shaft is configured as a tapered hole-forming portion, and wherein a maximum external diameter of the hole-forming portion is between 3% and 10% smaller, in particular 5% smaller, than a maximum external diameter of the annular protrusions.

Surprisingly, it has been demonstrated that such dimensioning of the maximum external diameter of the hole-forming portion delivers particularly good results when connecting at least two workplaces. On account thereof, the hole created after hole-forming by the hole-forming portion is somewhat smaller than the external diameter of the shaft in the region of the annular protrusions. Especially, the diameter of the hole that is formed by means of the hole-forming portion is between approximately 3% and 10% smaller than the external diameter. On account thereof, the holding portion has indeed to be pushed into the created hole under axial pressure, but a positive retention of the annular protrusions in the formed hole is also achieved. It has to be considered herein that the material that, after forming of the hole by means of the hole-forming portion, surrounds the formed hale is very hot and even at least in part molten or at least in a pasty state, respectively. On account thereof, the holding portion having the annular protrusions may be pushed in using minor axial force. The axial force herein may be chosen to be so minor that there is no risk of the mutually overlaid workpieces being flexed or deformed, respectively. On account thereof, light metal sheets may be interconnected using the connection element according to the invention without having to worry about comparatively large deformations of the light metal sheets. This is a decisive advantage of the connection element according to the invention in relation to a nail, for example, which is merely shot in an axial manner through the workpieces to be connected. Once the holding portion has been pushed into the hole that is formed by means of the hole-forming portion, the material surrounding the hole may flow into the intermediate spaces between the annular protrusions, the hole, however, at least contracting during cooling and thus ensuring reliable anchoring of the annular protrusions. Since the spacings between the two annular protrusions of the pair along the circumference are of dissimilar size, or since both annular protrusions of the pair of annular protrusions are disposed so as to be mutually parallel and so as to be at least in portions oblique in relation to the longitudinal axis, locking of the connection element may be achieved by twisting the connection element after the latter has been fully pushed into the formed hole. On account thereof, a resistance to unscrewing of the connection element is increased, and a mutual bias between the two workpieces may even be achieved. Significantly shorter connection times can be achieved as compared to flow drilling screws.

In a refinement of the invention the maximum external diameter of the hole-forming portion is larger than a core diameter of the shaft between the annular protrusions.

The diameter of the hole that is formed by means of the hole-forming portion thus lies between the core diameter of the shaft between the annular protrusions, and the external diameter of the annular protrusions. On account thereof, positive retention of the annular protrusions in the formed hole may be achieved, and it is also enabled that the heated material surrounding the hole flows between the annular protrusions, or at least that the hole during cooling contracts so heavily that a reliable retention of the annular protrusions and thus of the connection element is achieved.

In a refinement of the invention, an acceleration region having a constant external diameter is disposed between the head-side end of the hole-forming portion and the commencement of the holding portion, wherein the external diameter of the acceleration region is smaller than the maximum external diameter of the hole-forming portion.

It is achieved by means of such an acceleration region that the bolt, after forming the hole by means of the hole-forming portion, in relation to the two workplaces is accelerated in the axial direction as a result of the axial pressure exerted on said bolt. When the holding portion having the annular protrusions then comes into contact with the wall of the formed hole, the bolt then is already so fast, or has such a great impulse, that the holding portion having the annular protrusions may be pushed very rapidly into the formed hole until the lower side of the connection-element head bears on the upper side of the upper workplace.

In a refinement of the invention, the external diameter of the acceleration region is larger than or equal in size to the core diameter of the shaft between the annular protrusions.

It is decisive in terms of the external diameter of the acceleration region that the acceleration region is smaller than the internal diameter of the hole formed by means of the hole-forming portion. Upon axial push-fitting, optionally in combination with a rotation of the connection element, the friction between the formed hole and the connection element is thus heavily reduced once the acceleration region enters the hole. On account thereof, the connection element may yield to the axial pressure, being accelerated into the hole. The acceleration region herein commences already at the maximum diameter of the hole-forming portion, ending at the commencement of the holding portion, that is to say at the first annular protrusion. Proceeding from a maximum diameter of the hole-forming portion, the diameter of the shaft may thus first decrease so as to then transition to a cylindrical portion of the acceleration region.

In a refinement of the invention, a length of the acceleration region, in particular of the cylindrical portion of the acceleration region, is between 20% and 50%, in particular 30%, of the length of the hole-forming portion.

The length of the hole-forming portion, and also the length of the acceleration region, in particular of the cylindrical portion of the acceleration region, are adapted to the thickness of the workpieces to be interconnected. A length of the acceleration region between 20% and 50%, in particular 30%, of the length of the hole-forming portion ensures adequate acceleration of the connection element in relation to the workpieces, so as to achieve a very rapid push-fitting of the holding portion into the formed hole until a lower side of the connection-element head bears on the surface of the external workpiece.

In a refinement of the invention, the hole-forming portion at the free end thereof has a rounded tip.

In a refinement of the invention, the hole-forming portion, at least in the region of the free end thereof, has a polygonal cross section.

Reduced penetration times during hole-forming are achieved by means of such a polygonal cross section that may continue up to the tip which advantageously is rounded.

In a refinement of the invention, the polygonal cross section has rounded corners.

In a refinement of the invention, the polygonal cross section is configured so as to be triangular, having rounded corners.

Particularly positive results during hole-forming are achieved by means of a triangular cross section having rounded corners, wherein the corners may be connected by convexly curved lateral edges.

In a refinement of the invention, the acceleration region has a circular cross section.

A circular hole is generated by means of the hole-forming portion, even if and when the cross section of the hole-forming portion is polygonal. If and when the acceleration region is located within the hole, the friction between the connection element and the wall of the hole is to be reduced as far as possible, so as to thus accelerate the connection element in relation to the workpieces and thus also in relation to the hole. In order for this to be achieved, a circular cross section of the acceleration region is highly suitable, since the external wall of the acceleration region in this instance is uniformly spaced apart from the wall of the hole all around.

In a refinement of the invention, the holding portion has a circular cross section.

The holding portion, by way of the annular protrusions thereof, is provided for meshing with the wall of the hole that is formed by the hole-forming portion. Here too, a circular cross section of the holding portion is advantageous, at least the external circumference of the holding portion being advantageously circular.

The object on which the invention is based is also achieved by a method for connecting at least two workpieces, wherein the workpieces are placed on top of one another, and a connection element according to the invention is set in rotation and is placed on top of an external workpiece of the workpieces, wherein an axial pressure is exerted on the connection element until a lower side of the connection-element head bears on that surface of the external component that faces the connection-element head.

In that the connection element is set in rotation and is placed on top of an external workpiece of the workpieces, the free end of the hole-forming portion comes into contact with the external workplace. By way of the rotation of the hole-forming portion the workpiece is intensely heated in a localized manner, the hole-forming portion forming a hole having a passage in the two workpieces. To this end, apart from a rotation of the hole-forming portion, axial pressure acting on the connection element is also required. The axial pressure is maintained until the lower side of the connection-element head bears on that surface of the external component that faces the connection-element head. Herein lies a substantial difference in relation to a flow drilling screw. In the case of a flow drilling screw which in the holding portion is provided with a thread, axial pressure is no longer required once the thread, typically a tapping thread, engages in the wall of the hole that has been formed by means of the hole-forming portion. By way of simple rotation of the flow drilling screw, the latter by way of the thread is then drawn into the hole until the lower side of the screw head comes to bear. In the case of the method according to the invention and of the connection element according to the invention, no thread is provided in the holding portion so that axial pressure has to be maintained in order for the connection element to be press-fitted into the hole that has been formed by means of the hole-forming portion. In the case of the method according to the invention, this axial press-fitting herein may be performed as the connection element continues to rotate. As opposed to flow drilling screws, significant reductions in terms of time required for establishing the connection may be achieved using the connection element according to the invention and the method according to the invention.

In a refinement of the invention, the connection element, upon the placement of the lower side of the connection-element head on the surface of the external component, continues to rotate.

Surprisingly, it has been demonstrated that further rotation of the connection element does not further compromise the retention force of the connection element even once the head of the connection element bears on the external workpiece. In particular, no tearing of the hole wall arises, as always arises in the case of a flow drilling screw when rotation is not stopped once the screw head bears on the external workpiece.

In a refinement of the invention, the rotation angle of the rotating movement of the connection element, upon the placement of the lower side of the connection-element head on the external component, is larger than 360°.

Upon the placement of the lower side of the connection-element head, there is consequently not only simple locking of the connection element in the workplaces that is being performed. A rotation of less than 360° would only be required for such locking. Surprisingly, it has been demonstrated that, upon the placement of the connection-element head, rotation angles of more than 360° also cause a very positive retention force of the connection element. The wall of the hole that has been formed by means of the hole-forming portion, or the material that forms this wall, respectively, is intensely heated and may flow into the intermediate spaces between the annular protrusions, or in a pasty state and may move between the annular protrusions, respectively. This is supported by further rotation of the connection element upon the placement of the connection-element head on the external component. The intense heating of the material from which the wall of the formed hole is formed also leads to the hole contracting during cooling. On account thereof too, locking or blocking, respectively, of the holding portion of the connection element in the formed hole is facilitated.

In a refinement of the invention, the connection element, upon the placement of the lower side of the connection-element head on the external workpiece, is no longer driven to perform a rotating movement until the rotation of the connection element is decelerated to a standstill.

The rotating drive of the connection element may thus be switched off upon the placement of the connection-element head, and the deceleration to a standstill of the connection element by way of friction may simply be awaited.

In a refinement of the invention, the connection element, upon the placement of the lower side of the connection-element head on the external component, continues to be rotated about a predefined angle.

In this way, a defined rotating movement may be performed upon the placement, wherein the rotating movement may readily have rotation angles of more than 360°.

BRIEF DESCRIPTION OF THE DRAWINGS

Further features and advantages of the invention are derived from the claims and from the following description of preferred embodiments of the invention in conjunction with the drawings. In the drawings:

FIG. 1 shows a side view of a connection element according to the invention.

FIG. 2 shows a sectional view of the connection element of FIG. 1, parallel with the longitudinal axis.

FIG. 3 shows a sectional view of the acceleration region of the connection element of FIG. 1, perpendicular to the longitudinal axis.

FIG. 4 shows a sectional view of the hole-forming region of the connection element of FIG. 1, perpendicular to the longitudinal axis.

FIG. 5 shows an illustration of the connection element of FIG. 1, enlarged in portions.

FIG. 6 shows a further illustration of the connection element of FIG. 1, enlarged in portions.

Figure 10:
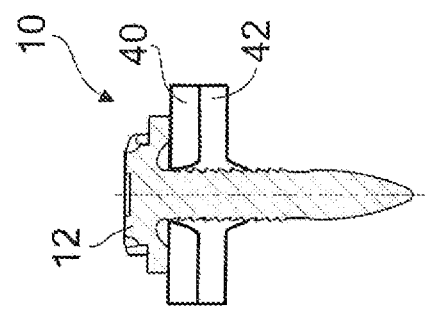
FIGS. 7 to 10 show various stages when connecting two workpieces by way of a connection element according to the invention.
Figure 9:
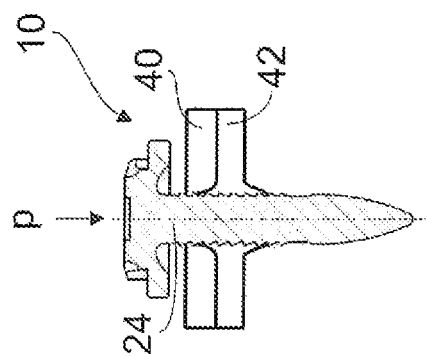

The illustration of FIG. 1 shows a connection element 10 according to the invention, according to a preferred embodiment of the invention. The connection element 10 has a connection-element head 12 and a shaft 14. The connection-element head on the upper side thereof is provided with a drive configuration 16. A lower side 18 of the connection-element head 12 is provided with an encircling annular groove 20, see FIG. 2, which is provided for receiving a material excavation of the external workplace when the lower side 18 of the connection element 10 bears on an external workplace. In the radially outward direction, a planar annular face 22 which is disposed perpendicularly to a central longitudinal axis of the connection element 10 adjoins the annular groove 20. The drive configuration 16 allows for the connection element 10 to be driven in only one rotation direction and for axial pressure, acting downwards in FIG. 1, to be applied to the connection-element head 12.

The salient regions of the shaft 14 are marked by square brackets in FIG. 1. Proceeding from the lower side 18 of the connection-element head 12, a holding portion 24 having a plurality of annular protrusions 26, 28 is disposed first. The holding portion 24 is followed by an acceleration region 30 which has a cylindrical portion and, as is shown by the length of the square bracket, runs from the annular protrusion 26 that is the most remote from the lower side 18 of the connection-element head 12, up to the commencement of a hole-forming portion 32. On account thereof, the acceleration region also has another expanding region in which the external diameter of the acceleration region 30 increases from the constant external diameter in the cylindrical region up to the maximum external diameter of the hole-forming portion 32.

The hole-forming portion 32 tapers off in the direction towards the free end of the shaft 14, terminating at a rounded tip 34.

FIG. 4 shows a section through the hole-forming portion 32, said section running perpendicularly to the central longitudinal axis of the connection element 10. It can be seen that the hole-forming portion 32 has a polygonal cross section in the form of a triangle having rounded corners. The rounded corners each are interconnected by means of slightly convexly curved lateral edges. The hole-forming portion 32 has such a polygonal cross section across the entire length thereof up to the tip 34.

FIG. 3 shows a cross section of the connection element 10, perpendicular to the central longitudinal axis, in the cylindrical portion of the acceleration region 30. The connection element 10 in the cylindrical acceleration region 30 has a circular cross section.

A cross section of the shaft 14 is also circular in the holding portion 24.

The enlarged view of FIG. 5 shows only the hole-forming portion 32, the acceleration region 30, and part of the holding portion 24 in an enlarged illustration.

A maximum external diameter of the hole-forming portion 32 lies at the head-side end of the hole-forming portion 32 and is identified by the reference sign A. A diameter in the cylindrical region of the acceleration region 30 is identified by B. A maximum external diameter of the annular protrusions 26, 28 is identified by C. The external diameters of the annular protrusions 26, 28 are of identical size such that the holding portion 24 has a cylindrical envelope. A core diameter of the holding portion 24 is identified by E.

It can be seen in the enlarged illustration of FIG. 5 that two annular protrusions 26, 28 always form one pair. The external diameter of the annular protrusion 28 is indeed sized identically to the external diameter of the annular protrusion 26. However, a spacing in the longitudinal direction of the connection element 10, between the two annular protrusions 26, 28 along the circumference, is of variable size, increasing from right to left in the illustration of FIG. 5, and decreasing from left to right. Accordingly, the annular protrusion 28 is disposed so as to be oblique to a longitudinal axis of the connection element 10, whereas the annular protrusion 26 runs perpendicularly to the longitudinal axis.

DETAILED DESCRIPTION

Alternatively, in a manner not illustrated, the annular protrusions 26, 28 may also be disposed so as to be mutually parallel, wherein the two annular protrusions in this instance are not completely disposed in a plane that runs perpendicularly to the longitudinal axis of the shaft, thus obliquely to the longitudinal axis, for example.

In terms of a potential design embodiment of the annular protrusions 26, 28, reference is made to the international unexamined and first publication WO 2015/022124 A1 by the same applicant, the disclosed content of which is hereby fully incorporated by reference. In this way, the annular protrusions may run obliquely to the longitudinal axis only in portions.

Prior to the commencement of the acceleration region 30, three annular protrusions 26 which all run in a mutually parallel manner are sequentially disposed when viewed in the longitudinal direction.

It can be seen in FIG. 1 that a total of three pairs of annular protrusions 26, 28 are sequentially disposed in the holding portion 24. Thereafter, there follow three annular protrusions 26 that run perpendicularly to the longitudinal axis, prior to the acceleration region 30 then commencing.

The cylindrical portion of the acceleration region 30 commences after the last annular protrusion 26. The cylindrical portion has the external diameter B. After the end of the cylindrical portion the external diameter of the acceleration region 30 increases until the acceleration region 30 at the maximum diameter A transitions to the hole-forming port ion 32. The hole-forming port ion 32 then continuously tapers off up to the rounded tip 34.

The maximum diameter A of the hole-forming portion 32 in the case of the illustrated embodiment is 5% smaller than the maximum external diameter C of the annular protrusions 26, 28. In the context of the invention, the maximum external diameter A may be between 3% and 10% smaller than the maximum external diameter C.

The external diameter B in the cylindrical portion of the acceleration region 30 in the illustrated embodiment corresponds to the core diameter D of the shaft 14 in the holding portion 24. The maximum external diameter A of the hole-forming portion 32 is larger than the diameter B in the cylindrical portion of the acceleration region 30, and also larger than the core diameter D of the holding portion 24. The maximum external diameter of the hole-forming portion 32, and thus also the diameter of the hole that is produced in the workpieces lying on top of one another, thus lies between the external diameter C of the annular protrusions 26, 28 and the core diameter D of the holding portion, or the external diameter B of the cylindrical portion of the acceleration region 30, respectively.

The illustration of FIG. 6 shows that portion of the connection element 10 of FIG. 1 that has already been illustrated in FIG. 5. FIG. 6 is utilized for illustrating the length ratios between the hole-forming portion 32 and the acceleration region 30. The hole-forming portion 32, from the rounded tip 34 to the maximum diameter A, has a length E. The acceleration region 30, from the maximum diameter A of the hole-forming region 32, the former simultaneously forming the end of the hole-forming region 32, up to the base of the first annular protrusion 26, has a length F. In the case of the connection element according to the invention, the length F of the acceleration region 30 is between 20% and 50% of the length E of the hole-forming portion 32. In the illustrated embodiment the length F of the acceleration region 30 is approximately 30% of the length E of the hole-forming portion 32.

It has emerged that the length ratios described by means of FIG. 6 and the diameter ratios described by means of FIG. 5 deliver outstanding results when connecting two workpieces by way of the connection element according to the invention. Very short cycle times during the hole formation and also when axially push-fitting the holding portion 24 may be especially achieved. Overall, reduction in cycle times of up to 50% may be achieved in relation to flow drilling screws or other connection elements. The connection elements 10 according to the invention and the method according to the invention are used, for example, for connecting aluminium panels to steel panels, or else for connecting two aluminium panels. The connection elements 10 herein may also serve only for pressing together the workpieces until the adhesive has cured when two workpieces are adhesively bonded.

The illustrations of FIGS. 7 to 10 show various method steps when carrying out the method according to the invention. The illustration of the connection element 10 is in each case schematic. It is also pointed out that the two workpieces 40, 42 to be interconnected during the connection procedure remain immovable and at the same level, as opposed to what may be assumed based on the arrangement of FIGS. 7 to 10.

Figure 7:
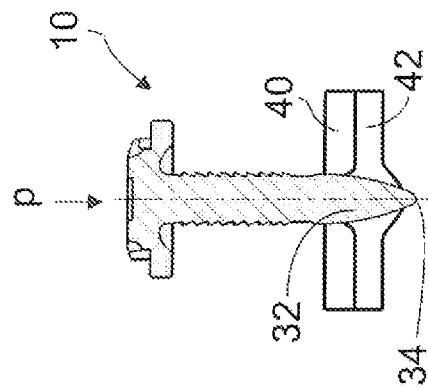

FIG. 7 shows a stage in the method according to the invention, in which the connection element 10, set in rotation, that is additionally impinged with an axial pressure P in the direction of the two workpieces 40, 42, by way of the tip 34 of the hole-forming portion 32 already has penetrated the two workpieces 40, 42. The maximum diameter A of the hole-forming region 32 in FIG. 7 lies approximately so as to be level with the surface of the external workpiece 40.

Figure 8:
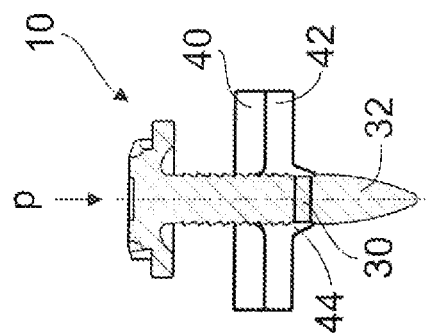

The connection element 10 is then further rotated, see FIG. 8, and continues to be impinged with an axial pressure P. The axial pressure P herein does not have to be constant in temporal terms. The hole-forming portion 32 now has formed a hole and a passage 44 in the lower workpiece 42. The acceleration region 30 is now located in the region of the hole, or of the passage 44, respectively. The diameter B in the acceleration region 30, that in relation to the maximum external diameter A at the end of the hole-forming region 32 is reduced, leads to the connection element 10 being able to yield more intensely to the axial pressure P, therefore being accelerated in the direction towards the two workpieces 40, 42.

This facilitates the axial press-fitting of the connection element 10 into the hole in the workpieces 40, 42 that has been configured by means of the hole-forming portion 32. The axial pressure P that continues to be maintained and the rotation that likewise continues to be maintained lead to the holding portion 24 by way of the annular protrusions thereof penetrating the hole that has been formed in the workpieces 40, 42, see FIG. 9.

Penetration into the two workpieces 40, 42 is performed until the lower side of the connection-element head 12 bears on that surface of the external workpiece 40 that faces the head, see FIG. 10. In the position of FIG. 10, further rotation of the connection element 10 is performed according to the method according to the invention. This rotation, upon placement of the lower side of the connection-element head 12, may be performed across an angle of more than 360°. It is provided within the context of the invention for a rotating drive (not illustrated in FIGS. 7 to 10) of the connection element 12 to be switched off, or for the connection element 10 to be continued to be driven. While the connection element 10 is the position of FIG. 10 continues to rotate, the material that forms the hole in the workpieces 40, 42 may flow between the annular protrusions 26, 28 of the holding portion 24, or may move into the intermediate spaces between the annular protrusions 26, 28, respectively. This may be performed by an actual flowing movement of the heated material. However, on account of the material that forms the hole in the workpieces 40, 42 cooling alone, the diameter of the hole is also reduced, meshing arising between the wall of the hole and the annular protrusions 26, 28 of the holding portion 24.

On account thereof, extremely short cycle times may be achieved when connecting the two workpieces 40, 42 using the connection element 10 according to the invention, and using the described method according to the invention. As has been elaborated, the mutually facing surfaces of the workpieces 40, 42 may be coated with an adhesive, the connection elements 10 serving for additionally mutually securing the two workpieces 40, 42 and holding the latter in the mutually compressed state until the adhesive has cured.

The invention claimed is:

1. Connection element for interconnecting at least two workpieces, having
   a shaft;
   a connection-element head, radially protruding beyond the external side of the shaft, at the one end of the shaft;
   a rotary drive configuration on the connection-element head, wherein in a holding portion of the shaft that emanates from the lower side of the connection-element head at least one pair of closed annular protrusions are disposed thereon, of which
   at least one annular protrusion is not completely disposed in a plane that runs perpendicularly to the longitudinal axis of the shaft; and
   the spacings between the two annular protrusions of the pair along the circumference are of dissimilar size, or the two annular protrusions of the pair of annular protrusions are disposed so as to be mutually parallel;
   wherein
   a front end of the shaft is configured as a tapered hole-forming portion, wherein
   a maximum external diameter of the hole-forming portion is between 3% and 10% smaller, in particular 5% smaller, than a maximum external diameter of the annular protrusions,
   further wherein each closed annular protrusion forms a closed ring.

2. Connection element according to claim 1,
   wherein the maximum external diameter (A) of the hole-forming portion is larger than a core diameter (D) of the shaft between the annular protrusions.

3. Connection element according to claim 1, characterized in that an acceleration region having an at least portion-wise constant external diameter (B) is disposed between the head-side end of the hole-forming portion and the commencement of the holding portion, wherein this external diameter (B) of the acceleration region is smaller than the maximum external diameter (A) of the hole-forming portion.

4. Connection element according to claim 3,
   wherein the external diameter (B) of the acceleration region is larger than or equal in size to the core diameter (D) of the shaft between the annular protrusions.

5. Connection element according to claim 3,
   wherein a length (F) of the acceleration region, in particular a length of the portion of the acceleration region having a constant diameter, is between 20% and 50%, in particular 30%, of the length (E) of the hole-forming portion.

6. Connection element according to claim 1,
   wherein the hole-forming portion at the free end thereof has a rounded tip.

7. Connection element according to claim 1,
   wherein the hole-forming portion, at least in the region of the free end thereof, has a polygonal cross section.

8. Connection element according to claim 7,
   wherein the polygonal cross section has rounded corners.

9. Connection element according to claim 7,
   wherein the polygonal cross section is configured so as to be triangular, having rounded corners.

10. Connection element according to claim 1,
    wherein the acceleration region has a circular cross section.

11. Connection element according to claim 1,
    wherein the holding portion has a circular cross section.

12. Method for connecting at least two workpieces, wherein the workpieces are placed on top of one another, and a connection element according to claim 1 is set in rotation and is placed on top of an external workpiece of the workpieces, wherein an axial pressure (P) is exerted on the connection element until a lower side of the connection-element head bears on that surface of the external component that faces the connection-element head.

13. Method according to claim 12, wherein the connection element, upon the placement of the lower side of the connection-element head on the surface of the external workpiece, continues to rotate.

14. Method according to claim 13, wherein a rotation angle of the rotating movement of the connection element, upon the placement of the lower side of the connection-element head on the external workpiece, is larger than 360°.

15. Method according to claim 13, wherein, upon the placement of the lower side of the connection-element head, the connection element is no longer driven to perform a rotating movement until the rotation of the connection element is decelerated to a standstill.

16. Method according to claim 13, wherein the connection element, upon the placement of the lower side of the connection-element head on the external workpiece, continues to be rotated about a predefined angle.

* * * * *

UNITED STATES PATENT AND TRADEMARK OFFICE
CERTIFICATE OF CORRECTION

PATENT NO.        : 10,508,676 B2
APPLICATION NO.   : 15/432436
DATED             : December 17, 2019
INVENTOR(S)       : Heiko Miller et al.

It is certified that error appears in the above-identified patent and that said Letters Patent is hereby corrected as shown below:

On the Title Page

(54) Title Please correct the title to read: --CONNECTION ELEMENT, AND METHOD FOR CONNECTING AT LEAST TWO WORKPIECES--

In the Specification

Column 1, Line 8 Delete "workplaces" and substitute therefore --workpieces--

Column 1, Line 30 Delete "workplaces" and substitute therefore --workpieces--

Column 1, Line 33 Delete "workplaces" and substitute therefore --workpieces--

Column 1, Line 55 Delete "workplaces" and substitute therefore --workpieces--

Column 2, Line 52 Delete "workplaces" and substitute therefore --workpieces--

Column 2, Line 60 Delete "workplace" and substitute therefore --workpiece--

Column 4, Line 13 Delete "workplace" and substitute therefore --workpiece--

Column 4, Line 61 Delete "workplaces" and substitute therefore --workpieces--

Column 5, Line 61 Delete "workplace" and substitute therefore --workpiece--

Column 5, Line 63 Delete "workplace" and substitute therefore --workpiece--

Signed and Sealed this
Twenty-third Day of June, 2020

Andrei Iancu
*Director of the United States Patent and Trademark Office*